(12) United States Patent
Balland

(10) Patent No.: US 6,464,947 B2
(45) Date of Patent: *Oct. 15, 2002

(54) CATALYTIC CONVERTER FOR VEHICLE EXHAUST

(75) Inventor: Jean J. Balland, Metz (FR)

(73) Assignee: Delphi Technologies, INC, Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,250

(22) Filed: Feb. 23, 1999

(65) Prior Publication Data

US 2002/0102191 A1 Aug. 1, 2002

(51) Int. Cl.$^7$ .......................... B01D 53/88; B01D 53/92; F01N 3/28
(52) U.S. Cl. ...................... 422/180; 422/171; 422/174; 422/177
(58) Field of Search ................ 422/171, 177, 422/180, 211, 222, 179, 221, 174

(56) References Cited

U.S. PATENT DOCUMENTS 3,992,157 A * 11/1976 Stute .................... 422/179
4,157,315 A * 6/1979 Michels et al. .......... 423/213.5
4,397,817 A * 8/1983 Otani et al. ................. 422/179
5,538,697 A * 7/1996 Abe et al. .................... 422/171

FOREIGN PATENT DOCUMENTS

| DE | 4436754 | 4/1995 |
| EP | 0697505 | 2/1996 |
| EP | 0821146 | 1/1998 |
| WO | 95/08702 | 3/1995 |

* cited by examiner

Primary Examiner—Hien Tran
(74) Attorney, Agent, or Firm—Vincent A. Cichosz

(57) ABSTRACT

A catalytic converter for an exhaust system of a motor vehicle comprising a housing having an inlet and an outlet; a first brick positioned inside the housing adjacent the inlet for initiating catalytic light-off functions of exhaust gases flowing through the first brick; a second brick positioned adjacent the first brick downstream of the inlet for three way conversion of exhaust gases flowing through the second brick; a third brick positioned adjacent the second brick downstream of the inlet for hydrocarbon adsorption and oxidation of exhaust gases flowing through the third brick; and a fourth brick positioned adjacent and spaced from the third brick downstream of the inlet for light-off of exhaust gases flowing through the fourth brick; wherein the third brick is substantially annular with a through bore extending axially therethrough; and wherein the second brick has a closed bore extending axially and opening into the through bore of the third brick.

19 Claims, 1 Drawing Sheet

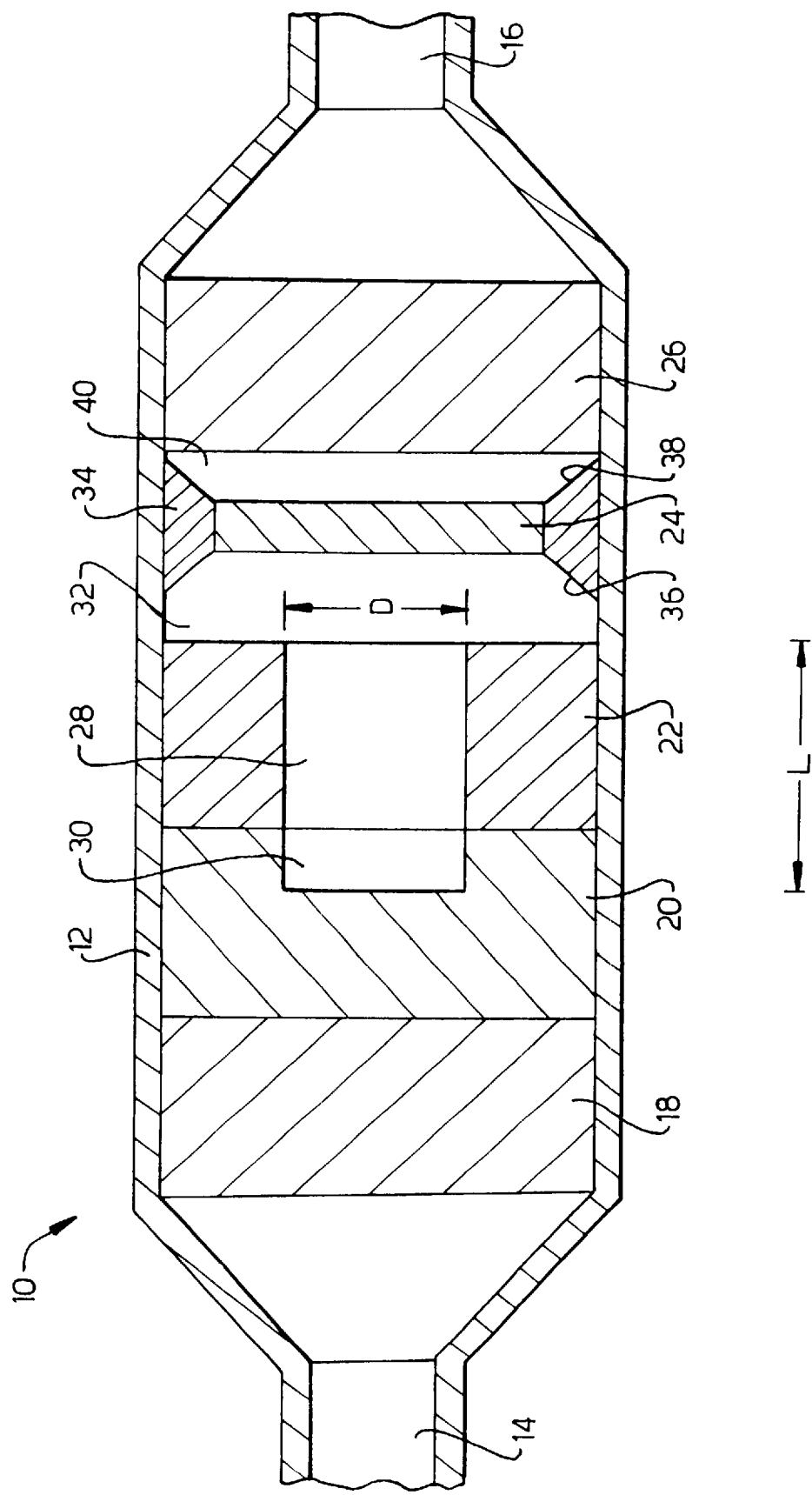

CATALYTIC CONVERTER FOR VEHICLE EXHAUST

TECHNICAL FIELD

The present invention relates to a catalytic converter for the exhaust system of a motor vehicle.

BACKGROUND OF THE INVENTION

The use of a catalytic converter in the exhaust system of motor vehicle is well known. The catalytic converter acts on the exhaust gases leaving the engine of the vehicle to convert carbon monoxide, the oxides of nitrogen, and hydrocarbons in the exhaust gases. A typical catalytic converter consists of a number of bricks (coated substrates) through which the exhaust gases can pass. In order to work efficiently, these bricks must be at a temperature which is above the light-off temperature—the temperature above which conversion is most effectively achieved. The temperature of the exhaust gases is used to maintain the temperature of these bricks above the light-off temperature (the threshold temperature above which the catalyst is active). However, when the engine is started from cold, there is an initial period (the cold phase or light off time) when the catalytic converter is cold and inactive but exhaust gases are passing through the converter. During this initial period, the converter is not working in an efficient manner.

SUMMARY OF THE INVENTION

It is an object of the present invention to provide a catalytic converter with a reduced inactive period after a cold start.

A catalytic converter in accordance with the present invention for an exhaust system of a motor vehicle comprises a housing having an inlet and an outlet; a first brick positioned inside the housing adjacent the inlet for initiating catalytic light-off functions of exhaust gases flowing through the first brick; a second brick positioned adjacent the first brick downstream of the inlet for three way conversion of exhaust gases flowing through the second brick; a third brick positioned adjacent the second brick downstream of the inlet for hydrocarbon adsorption and oxidation of exhaust gases flowing through the third brick; and a fourth brick positioned adjacent and spaced from the third brick downstream of the inlet for light-off of exhaust gases flowing through the fourth brick; wherein the third brick is substantially annular with a through bore extending axially therethrough; and wherein the second brick has a closed bore extending axially and opening into the through bore of the third brick.

The catalytic converter of the present invention is such that the fourth brick is heated by exhaust gases passing through the aligned bores to its light-off temperature before the third brick reaches its threshold (desorption) temperature. Such an arrangement reduces the inactive period for the converter when compared to previously known arrangements with minimal increase in cost or complexity. In a preferred arrangement, the fourth brick is a coated metallic foam which enhances gas mixing in the brick and improves radial heat conduction.

BRIEF DESCRIPTION OF THE DRAWINGS

The present invention will now be described, by way of example, with reference to the accompanying drawings, in which:FIG.

FIG. 1 is a cross-sectional view of a catalytic converter in accordance with the present invention.

DESCRIPTION OF THE PREFERRED EMBODIMENT

Referring to the drawing, the catalytic converter 10 in accordance with the present invention is for use in an exhaust system (not shown) connected to an engine of a motor vehicle. The converter 10 comprises a housing 12 having an inlet 14 and an outlet 16. The inlet 14 receives exhaust gases from the engine, and the outlet 16 directs converted exhaust gases towards the outlet of the exhaust system, so gas flow through the converter 10 is from the inlet to the outlet. The inlet 14 and outlet 16 may be substantially aligned. Positioned within the housing 12 are first, second, third, fourth and firth bricks 18, 20, 22, 24, 26, respectively, with the first brick 18 adjacent the inlet 14 and the fifth brick 26 adjacent the outlet 16. The second brick 20 is positioned between, and in contact with, the first and third bricks 18, 22, and the fourth brick 24 is positioned between, and spaced from, the third and fifth bricks 22, 26. The bricks 18, 20, 22, 24, 26, which are described in more detail below, allow exhaust gases to flow through the converter 10 from the inlet 14 to the outlet 16.

The first brick 18 is a coated substrate which has the primary function of initiating the catalytic conversion of the gases when the system Starts from cold (ambient) conditions. The second brick 20 is a coated substrate which has the primary function of providing three way catalytic conversion (CO to $CO_2$, NO to $N_2O$ and HC to $H_2O$ and $CO_2$) complementary to the first brick 18 especially after the light-off phase. The second brick 20 is meant to achieve maximum conversion in the whole engine operating range when the converter 10 is heated to its normal operating temperature. The third brick 22 is a coated substrate which has the primary functions of hydrocarbon adsorption and hydrocarbon oxidation. The fourth brick 24 is a coated foam (preferably metallic, such as stainless steel, or a material having similar characteristics) which has the primary function of rapid light-off, and rapid thermal response. The fifth brick 26 (which is optional) is a coated substrate which has the primary function of three way conversion. The coating material(s) on the bricks 18–26, and the material(s) for the substrates for the first, second, third and fifth bricks and the foam for the fourth brick, can be any known or suitable material(s) for fulfilling the primary functions mentioned above.

The axial lengths of the first and second bricks 18,20 are predetermined to maintain the third brick 22 below its desorption temperature until after the temperature of the first brick 18 has risen above its light-off temperature.

The third brick 22 is substantially annular and has a through bore 28 which opens into a closed bore 30 formed in the second brick 20. The bores 28, 30 extend axially along the longitudinal axis of the converter 10. The through bore 28 also opens into a space 32 between the third brick 22 and the fourth brick 24. The fourth brick 24 has a reduced outer diameter compared to the other bricks 18, 20, 22, 26 and is mounted on an annular support member 34 having an angled upstream face 36 and an angled downstream face 38. The angled face 36, 38 are provided to reduce flow restrictions.

In use, the exhaust gases which flow through a fist brick 18 and the second brick 20into the bores,28, 30 arrive at the fourth brick 24d with a higher temperature than the exhaust gases which flow through the first, second and third bricks 18, 220,22 before arriving at the fourth brick.

The exhaust gases which flow through the bores 28,30 induce a rate of temperature rise in the fourth brick 24 whilst the third brick 22 is being heated at a slower rate by the exhaust gases flowing through the second and third bricks 20, 22. The exhaust gases flowing through the second and third bricks 20,22 are cooled down by heat transfer to the substrate. The temperature differential between these two streams of exhaust gases is dependent on the diameter D and axial length L of the bores 28, 30. This has the effect of delaying the time taken for the third brick 22 to reach its descorption temperature ( the threshold temperature above which the third brick releases stored hydrocarbons) until after the fourth brick 24 has been heated above its light-off temperature. As a consequence, the hydrocarbons subsequently released by the third brick 22 are converted by the fourth brick 24. The values for D and L are specific to the exhaust system to which the converter 10 is attached and are determined accordingly to ensure that the fourth brick 24 is heated to its light-off temperature before the third brick 22 reaches its deorption temperature.

The reduced passage of the fourth brick 24 forces the mixing the exhaust gases flowing out of the third brick 22 and the bores 28,30 in the space 32. The metallic foam of the fourth brick 24 provides an open pore structure which acts as a thermally responsive element within the converter 10. Such an element provides exhaust gas flow mixing because of the random structure, and radial heat conduction. The outer diameter of the fourth brick 24 is reduced to concentrate heating from the exhaust gases flowing out of the bores 28,30 on a smaller surface area. The angled downstream face 38 of the support member 34 allows the converted exhaust gases flowing out of the fourth brick 24 to pass through the space 40 between the fourth and fifth bricks 24,26 to reach the full cross-sectional area of the fifth brick.

What is claimed is:

1. A catalytic converter for an exhaust system of a motor vehicle comprising:
    a housing having an inlet and an outlet;
    a first catalytic brick positioned inside the housing adjacent the inlet for initiating catalytic light-off functions of exhaust gases flowing through the first brick;
    a second catalytic brick positioned adjacent the first brick downstream of the inlet for three way conversion of exhaust gases flowing through the second brick;
    a third catalytic brick positioned adjacent the second brick downstream of the inlet for hydrocarbon adsorption and oxidation of exhaust gases flowing through the third brick; and
    a fourth catalytic brick positioned adjacent and spaced from the third brick downstream of the inlet for light-off of exhaust gases flowing through the fourth brick;
    wherein the third brick is substantially annular with a through bore extending axially therethrough; and
    wherein the second brick has a closed bore in contact with, extending axially and opening into the through bore of the third brick.

2. A catalytic converter as claimed in claim 1, wherein the fourth brick is mounted on an annular support member and has a reduced diameter compared to an outer diameter of the third brick.

3. A catalytic converter as claimed in claim 2, wherein the annular support member has an angled upstream face in a space between the third and fourth bricks.

4. catalytic converter as claimed in claim 1, wherein the fourth brick comprises a coated foam.

5. A catalytic converter as claimed in claim 1, further comprising a fifth catalytic brick positioned adjacent and spaced from the fourth brick downstream of the inlet for three way conversion of exhaust gases flowing through the fifth brick.

6. A catalytic converter as claimed in claim 5, wherein the fourth brick is mounted on an annular support member.

7. A catalytic converter as claimed in claim 6, wherein the annular support member has an angled downstream face in a space between the fourth and fifth bricks.

8. A catalytic converter as claimed in claim 4, wherein the coated foam is a metallic foam.

9. A catalytic converter, comprising:
    a first catalytic brick positioned inside a housing;
    a third catalytic brick positioned down of the first brick, wherein the third brick is substantially annular with a through bore extending axially theretrough;
    a second catalytic brick positioned between the first brick and the third brick and in contact with the third catalytic brick, wherein the second brick has a closed bore extending axially and opening into the through bore of the third brick; and
    a fourth catalytic brick positioned adjacent, downstream, and spaced from the third brick.

10. A catalytic convener as claimed in claim 9, wherein the fourth brick is mounted on an annular support member and has a reduced diameter compared to an outer diameter of the third brick.

11. A catalytic converter as claimed in claim 10, wherein the annular support member has an angled upstream face in a space between the third and fourth bricks.

12. A catalytic converter as claimed in claim 9, wherein the fourth brick comprises a coated foam.

13. A catalytic converter as claimed in claim 12, wherein the coated foam is a metallic foam.

14. A catalytic converter as claimed in claim 9, further comprising a fifth catalytic brick positioned adjacent and spaced from the fourth brick, on a side of the fourth brick opposite the third brick.

15. A catalytic converter as claimed in claim 14, wherein the fourth brick is mounted on an annular support member having an angled downstream face in a space between the four and fifth bricks.

16. A catalytic converter for an exhaust system of a motor vehicle comprising:
    a first catalytic brick positioned inside a housing;
    a third catalytic brick positioned downstream of the first brick;
    a second catalytic brick positioned between and in contact with the first brick and the third brick, wherein the second brick has a closed bore extending axially, and contiguous to and opening into a through bore extending axially through the third brick; and
    a fourth catalytic brick positioned adjacent, downstream, and spaced from the third brick, wherein the fourth brick is mounted on an annular support member having an angled downstream face in a space between the third brick and the fourth brick.

17. A catalytic converter as claimed in claim 16, further comprising a fifth catalytic brick positioned adjacent and spaced from the fourth brick, on a side of the fourth brick opposite the third brick.

18. A catalytic converter as claimed in claim 17, wherein the annular support member has an angled downstream face in a space between the fourth and fifth bricks.

19. A method for operating a catalytic converter, comprising:
    passing a gas through a first catalytic brick and a second catalytic brick
    passing a first portion of the gas through a third catalytic brick, and passing a second portion of the gas from a closed bore of the second brick through a though bore extending axially through the third brick, wherein the closed bore is in contact with the through bore;

passing the first portion and second portion of the gas through a fourth catalytic brick; and heating the fourth brick to a fourth brick light-off temperature before heating the third brick to a third brick desorption temperature.

* * * * *